(12) United States Patent
Burdett

(10) Patent No.: US 8,746,553 B2
(45) Date of Patent: Jun. 10, 2014

(54) PAYMENT DEVICE UPDATES USING AN AUTHENTICATION PROCESS

(75) Inventor: Richard Burdett, Sawbridgeworth (GB)

(73) Assignee: Mastercard International Incorporated Purchase, New York ( * ) Notice: Subject to any disclaimer, the term of this patent is extended or adjusted under 35 U.S.C. 154(b) by 426 days.

(21) Appl. No.: 12/890,891

(22) Filed: Sep. 27, 2010

(65) Prior Publication Data

US 2012/0074219 A1    Mar. 29, 2012

(51) Int. Cl.
*G06K 5/00* (2006.01)
*G06K 7/01* (2006.01)
*G06K 19/00* (2006.01)
*H04L 9/32* (2006.01)
*G06F 21/00* (2013.01)

(52) U.S. Cl.
USPC ........ 235/380; 235/487; 235/382.5; 713/171; 713/184

(58) Field of Classification Search
USPC ............... 235/380, 487, 383, 382.5; 713/171, 713/184, 186
See application file for complete search history.

(56) References Cited

U.S. PATENT DOCUMENTS

| | | | | |
|---|---|---|---|---|
| 6,488,206 B1* | 12/2002 | Flaig et al. | ..................... | 235/380 |
| 8,196,818 B2 | 6/2012 | Van de Velde | | |
| 8,370,258 B2 | 2/2013 | Roberts | | |
| 8,401,964 B2 | 3/2013 | Radu | | |
| 2003/0135740 A1* | 7/2003 | Talmor et al. | .................. | 713/186 |
| 2003/0145205 A1* | 7/2003 | Sarcanin | ........................ | 713/172 |
| 2005/0119978 A1 | 6/2005 | Ates | | |
| 2007/0251997 A1* | 11/2007 | Brown et al. | .................. | 235/380 |
| 2008/0154770 A1 | 6/2008 | Rutherford | | |
| 2008/0301461 A1* | 12/2008 | Coulier et al. | ................. | 713/184 |
| 2010/0274712 A1 | 10/2010 | Mestre | | |
| 2010/0276484 A1* | 11/2010 | Banerjee et al. | ............... | 235/379 |
| 2010/0287375 A1* | 11/2010 | Lee | ............................... | 713/171 |

FOREIGN PATENT DOCUMENTS

| | | |
|---|---|---|
| WO | WO/2010/126994 | 4/2010 |
| WO | WO/2010/127000 | 4/2010 |
| WO | WO/2010/127003 | 4/2010 |
| WO | WO/2010/127012 | 4/2010 |
| WO | WO2012037971 A1 | 3/2012 |

OTHER PUBLICATIONS

Wikipedia, Chip Authentication Program, downloaded from http://en.wikipedia.org/wiki/Chip_Authentication_Program, Apr. 17, 2013, pp. 1-6.

* cited by examiner

*Primary Examiner* — Thien T Mai
(74) *Attorney, Agent, or Firm* — Otterstedt, Ellenbogen & Kammer, LLP

(57) ABSTRACT

A payment device—payment device reader combination obtains issuer token data that was generated by an issuer entity from: input data, and an issuer application cryptogram based on the input data and a session key. The issuer token data is disassembled by the payment device—payment device reader combination to obtain the input data and the issuer application cryptogram, and the payment device—payment device reader combination computes a payment device application cryptogram based on the input data and the session key. This is compared, by the payment device—payment device reader combination, to the issuer application cryptogram. If the payment device application cryptogram matches the issuer application cryptogram, at least one action is allowed to take place on the payment device.

28 Claims, 4 Drawing Sheets

US 8,746,553 B2

PAYMENT DEVICE UPDATES USING AN AUTHENTICATION PROCESS

FIELD OF THE INVENTION

The present invention relates generally to the electronic and computer arts, and, more particularly, to apparatus and methods for electronic payment.

BACKGROUND OF THE INVENTION

An application running on a "smart" payment card or other payment device, together with a personal card reader, can be used to create a unique code (for example, one that only the issuer can decode) that can be sent to an issuer. This can ensure to the issuer that the card that created the code is genuine. Additionally, by having the card or other payment device carry out personal identification number (PIN) verification, so that, for example, a card will only create the aforementioned code when a PIN has been verified, the issuer can then determine that the card is genuine and that the person using the card is arguably the correct cardholder (since he or she has entered the correct PIN). Accordingly, the issuer, based on this established level of trust, will allow certain actions to take place.

It is known to reset data elements or risk management parameters on a chip based banking card by receiving an authentication code from the card issuer, during an online process wherein the card is captured in a merchant's terminal. For example, the terminal and network infrastructure based on EMVCo allows updates as part of an online authorization response and implements three mechanisms for doing so:

Updates prior to the 2nd Generate AC—the so-called critical scripts (tag 71, described in EMV specifications)

Issuer Authentication data, sent as part of the 2nd Generate AC (tag 91, described in EMV specifications) or in an External Authenticate command (described in EMV Specifications)

Updates after the 2nd Generate AC—the so-called non-critical scripts (tag 72, described in EMV specifications).

SUMMARY OF THE INVENTION

Principles and embodiments of the invention provide techniques for payment device updates using an authentication process. An exemplary method, according to one aspect of the invention, includes the step of obtaining, by a payment device—payment device reader combination, issuer token data. The issuer token data was generated by an issuer entity from: input data, and an issuer application cryptogram based on the input data and a session key. Additional steps include disassembling the issuer token data, with the payment device—payment device reader combination, to obtain the input data and the issuer application cryptogram; computing, with the payment device—payment device reader combination, a payment device application cryptogram based on the input data and the session key; comparing, with the payment device—payment device reader combination, the payment device application cryptogram to the issuer application cryptogram; and allowing at least one action to take place on the payment device if the payment device application cryptogram matches the issuer application cryptogram.

Another exemplary method, according to another aspect of the invention, includes the step of computing, by an issuer entity, an issuer application cryptogram based on input data and a session key. The session key was created by a payment device—payment device reader combination during an initial cardholder authentication process. Additional steps include using the input data and the issuer application cryptogram to assemble issuer token data; and facilitating provision of the issuer token data to the payment device—payment device reader combination.

Further, yet another exemplary method, according to yet another aspect of the invention, includes the steps of obtaining, at a payment device—payment device reader combination, during an initial cardholder authentication process, first input data; deriving, from the first input data, by the payment device—payment device reader combination, a session key, during the initial cardholder authentication process; computing, by the payment device—payment device reader combination, a first payment device application cryptogram based on the input data and the session key, during the initial cardholder authentication process; facilitating provision of first payment device token data, based on the first input data and the first payment device application cryptogram, to an issuer entity, during the initial cardholder authentication process; disassembling, by the issuer entity, of the first payment device token data, to obtain the first input data and the first payment device application cryptogram, during the initial cardholder authentication process; computing, by the issuer entity, a first issuer entity application cryptogram based on the input data and the session key, during the initial cardholder authentication process; authenticating a holder of the payment device if the first issuer entity application cryptogram matches the first payment device application cryptogram, during the initial cardholder authentication process; responsive to the authentication, computing, by the issuer entity, a second issuer application cryptogram based on second input data and the session key; using the second input data and the second issuer application cryptogram to assemble issuer token data; facilitating provision of the issuer token data to the payment device—payment device reader combination; obtaining, by the payment device—payment device reader combination, the issuer token data; disassembling the issuer token data, with the payment device—payment device reader combination, to obtain the second input data and the issuer application cryptogram; computing, with the payment device—payment device reader combination, a second payment device application cryptogram based on the second input data and the session key; comparing, with the payment device—payment device reader combination, the second payment device application cryptogram to the second issuer application cryptogram; and allowing at least one action to take place on the payment device if the second payment device application cryptogram matches the second issuer application cryptogram.

An even further exemplary method, according to a still further aspect of the invention, includes the step of obtaining, by a payment device, disassembled issuer token data. The disassembled issuer token data was generated by disassembling issuer token data. The issuer token data was generated by an issuer entity from: input data, and an issuer application cryptogram based on the input data and a session key. Additional steps include computing a payment device application cryptogram based on the input data and the session key; comparing the payment device application cryptogram to the issuer application cryptogram; and allowing at least one action to take place on the payment device if the payment device application cryptogram matches the issuer application cryptogram.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. For example, a payment device with a payment device memory storing a payment device application in a non-transitory manner, and at least one payment device processor coupled thereto, could be employed in connection with some or all of the first method steps; a system with a memory storing an issuer platform application in a non-transitory manner, and at least processor coupled thereto, could be employed in connection with some or all of the second method steps; and a payment device-payment device reader combination, as well as an issuer entity, could be employed in connection with some or all of the third method steps. The issuer entity could have an issuer entity memory storing an issuer platform application in a non-transitory manner, and at least one issuer entity processor coupled thereto. The payment device-payment device reader combination could have a payment device-payment device reader combination memory storing at least one payment application in a non-transitory manner, and at least one payment device-payment device reader combination processor coupled thereto.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention can provide substantial beneficial technical effects; for example:
a cardholder can reset risk management parameters or reload value onto a bank-issued chip card using a bank-issued personal card reader.
an ability to determine that the issuer is authentic while allowing data parameters on the card to be reset.
enable one to reset offline counters and offline risk management parameters without having to establish a physical (electronic) connection between the card and the issuer.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
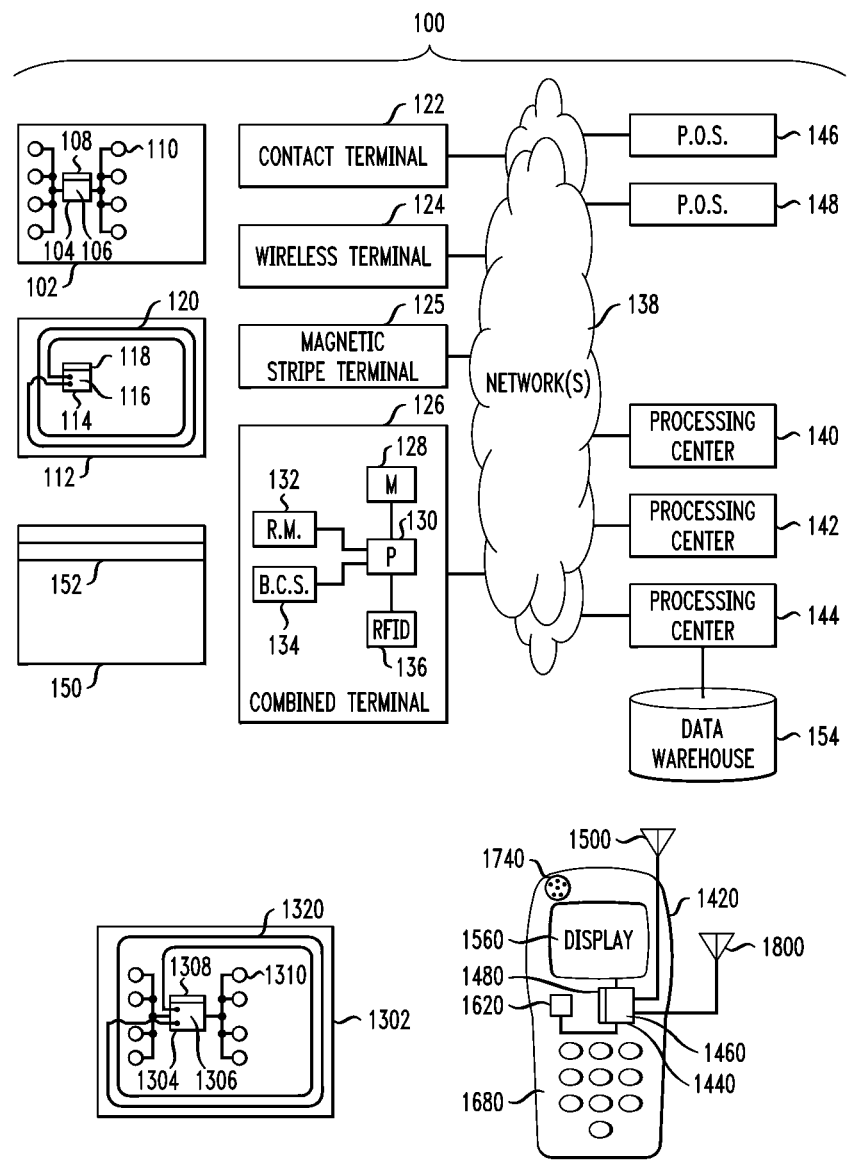
FIG. 1 shows an example of a system and various components thereof that can implement techniques of the invention.

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory (e.g., one or more EEPROMs as discussed below). The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 June 2008

EMV Integrated Circuit Card Specifications for Payment Systems Book 2 Security and Key Management Version 4.2 June 2008

EMV Integrated Circuit Card Specifications for Payment Systems Book 3 Application Specification Version 4.2 June 2008

EMV Integrated Circuit Card Specifications for Payment Systems Book 4 Cardholder, Attendant, and Acquirer Interface Requirements Version 4.2 June 2008

The following documents may be of interest in some circumstances and are also expressly incorporated herein by reference in their entirety for all purposes (the same are published by EMVCo and available on EMVCo's web site):

*EMV Integrated Circuit Card Specifications for Payment Systems—Common Payment Application Specification*, Version 1.0, December 2005

*Corrections to Common Core Definitions*, Specification Update Bulletin No. 41, First Edition June 2005, EMVCo

*Support for Transaction Log Files*, Specification Update Bulletin N° 19 Second Edition, May 2004, EMVCo.

As noted, cards 102, 112 are examples of a variety of payment devices that can be employed. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. In some cases, the cards, or other payment devices, can include body portions (e.g., laminated plastic layers of a payment card, case or cabinet of a PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

In one or more versions of the infrastructure, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 can also be employed in infrastructure 100. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for the payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided.

The description of devices, elements, or components 102, 104, 106, 108, 110, 112, 114, 116, 118, 120 throughout this document are equally applicable to the corresponding items in the dual interface card 1302 and cellular telephone handset 1420.

Figure 2:
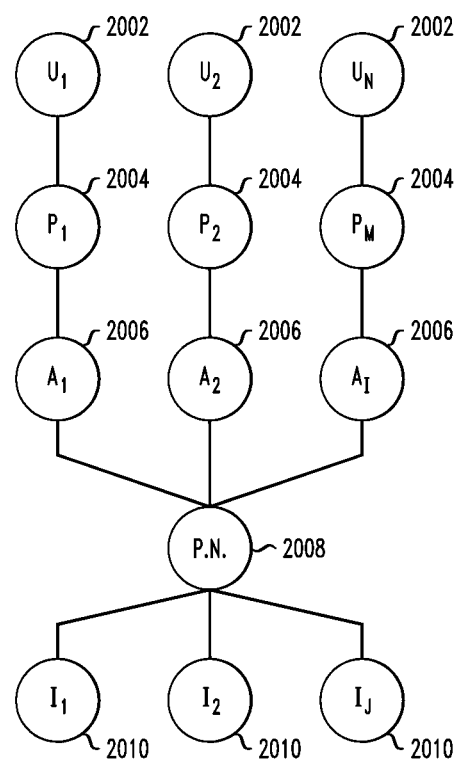
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots$ through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M. I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks. The skilled artisan will appreciate that some proprietary or closed payment networks include only a single issuer and acquirer.

Messages within a network such as network 138 and/or network 2008, may, in at least some instances, conform to the International Organization for Standardization (ISO) Standard 8583, *Financial transaction card originated messages— Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

Principles of the invention include techniques for performing chip-based payment card updates using an extended cardholder authentication process. Accordingly, one or more embodiments of the invention include extending the cardholder and card authentication process to send a code (for example, a numeric or alpha-numeric code) created by the issuer back to the card. The card can determine that the code sent has come from the genuine issuer, and on the basis of that, know that the issuer is allowing something to happen to that card. For example, the issuer can allow for value to be reloaded onto that card, for risk management parameters to be reset, and the like. Risk management parameters may include, for example, an allowable number of offline transactions before a card must go online, an allowable amount of offline spending, and so on.

In existing approaches, loading of value and/or resetting of risk management parameters requires a physical connection between the issuer and the card, for example, by the card being inserted in a retail terminal, and the retail terminal establishing a communications link to the issuer. One or more embodiments of the invention advantageously use a code that is sent to the cardholder, for example, over a telephone line or over an internet connection by displaying it on a screen. By entering that code into, for example, a hand-held reader, the reader can send the code to the card and the card can effectively determine that the code has come from the genuine issuer, and on the basis of the code, will allow actions to take place on the card.

In chip-based payment products, the card can contain a series of data elements that can be reset following the receipt of an authenticated message from the issuer of the card. One or more embodiments of the invention include enabling an authentication code to be created by a card issuer following an interaction with a cardholder via a website or voice communication, and for an issuer authentication code to be returned to the card via a contact or contactless personal card reader. Thus, in one or more embodiments of the invention, the card can advantageously use the code to determine that the issuer is authentic and allow data parameters on the card to be reset. The card reader may, in some instances, be bank-issued.

Non-limiting exemplary applications of one or more embodiments include replenishment of contactless-only devices and/or allowing a virtual link between a cardholder and an issuer without the need to present the card at a merchant's brick-and-mortar location.

As described herein, the data contained on a payment card can be updated following the validation of an authentication code sent to the card via a bank-issued personal card authentication reader. Such a validation can be performed, for example, using either a contact or contactless communication interface process to communicate with the chip payment card.

As noted, one or more embodiments of the invention include facilitating an authenticated message to be sent to the card via a bank issued personal card reader. The cardholder can, by way of example, key in an authentication code that is provided to him or her via a secure internet portal or verbally during a voice communication with the issuing bank (or a bank representative). Additionally, in one or more embodiments of the invention, an authentication code can be sent directly to a reader connected directly to a secure internet portal (for example, if reader 304, 350 was connected to a user's PC via a USB cable or the like). Thus, the cardholder can, for example, reset risk management parameters and/or reload value onto a bank-issued chip card using a bank-issued personal card reader. Additionally, one or more embodiments of the invention enable people who cannot physically connect to an issuer system to re-load cards through alternative measures.

One or more embodiments of the invention are applicable to all chip-based bank payment cards that support a contact or contactless chip interface including, for example, dual interface products that support both a contact chip and a contactless interface. Accordingly, a cardholder will be enabled to authenticate that the entity that he or she is transacting with is the genuine issuer of the card that he or she holds, and that this authentication can be accomplished, for example, via the internet or a telephone interaction between the cardholder and the card issuer.

Accordingly, one or more embodiments of the invention provide increased security for a cardholder that will allow the cardholder to verify that the entity he or she is transacting with is the genuine issuer of the card that he or she holds.

Additionally, one or more embodiments of the invention, when implemented with an existing cardholder authentication process, enable a two-way authentication process to take place. Security processes exist to allow cardholder and transaction authentication to take place with an issuer. One or more embodiments of the invention can include extending such approaches to allow a cardholder to receive an authentication code from the card issuer that a connected or unconnected personal card reader can validate as genuine using cryptography functions available in the chip card held by the cardholder.

Having authenticated him or herself to the card issuer (for example, using existing processes), the cardholder can request over the phone or be automatically sent a one-off use Issuer Token created by the card issuer that is unique to the card held by the cardholder. This information is entered into the reader and validated by the card. The success or failure of the validation can be presented to the cardholder on the reader display and also enable card data reset functions to be activated, allowing risk management features of the card to be reset.

Additionally, one or more embodiments of the invention can be implemented onto a contactless-only product. Such an embodiment includes establishing a virtual link between an issuer and a cardholder and a cardholder product.

Further, as additionally described herein, one or more embodiments of the invention include using a cryptographic process to allow the card and/or the reader to decode the code. In one or more embodiments of the invention, this can be done using a well-known symmetric key cryptographic process. In addition to sending the code, the issuer sends information to be passed to the card or keyed-in to indicate that the code was created using that information. Only the card and the issuer will have the (common) key to determine that the code was created from this information. Accordingly, if the card can generate the same code based on the information that it is given, then the card is ensured that the code came from the issuer (because the issuer was using the same key). By way of clarification, as will be discussed in greater detail below, the cardholder is provided with issuer token data by voice or internet screen display. This issuer token data is based on input data, and an application cryptogram computed by the issuer using the input data and a session key (single-use symmetric key) known only to the card or device application and the issuer. The card application computes an application cryptogram based on the input data, obtained by recreating the issuer token data, and its copy of the session key; if the result matches the application cryptogram computed by the issuer and provided to the card application in the issuer token data, the authenticity of the issuer is verified.

Figure 3:
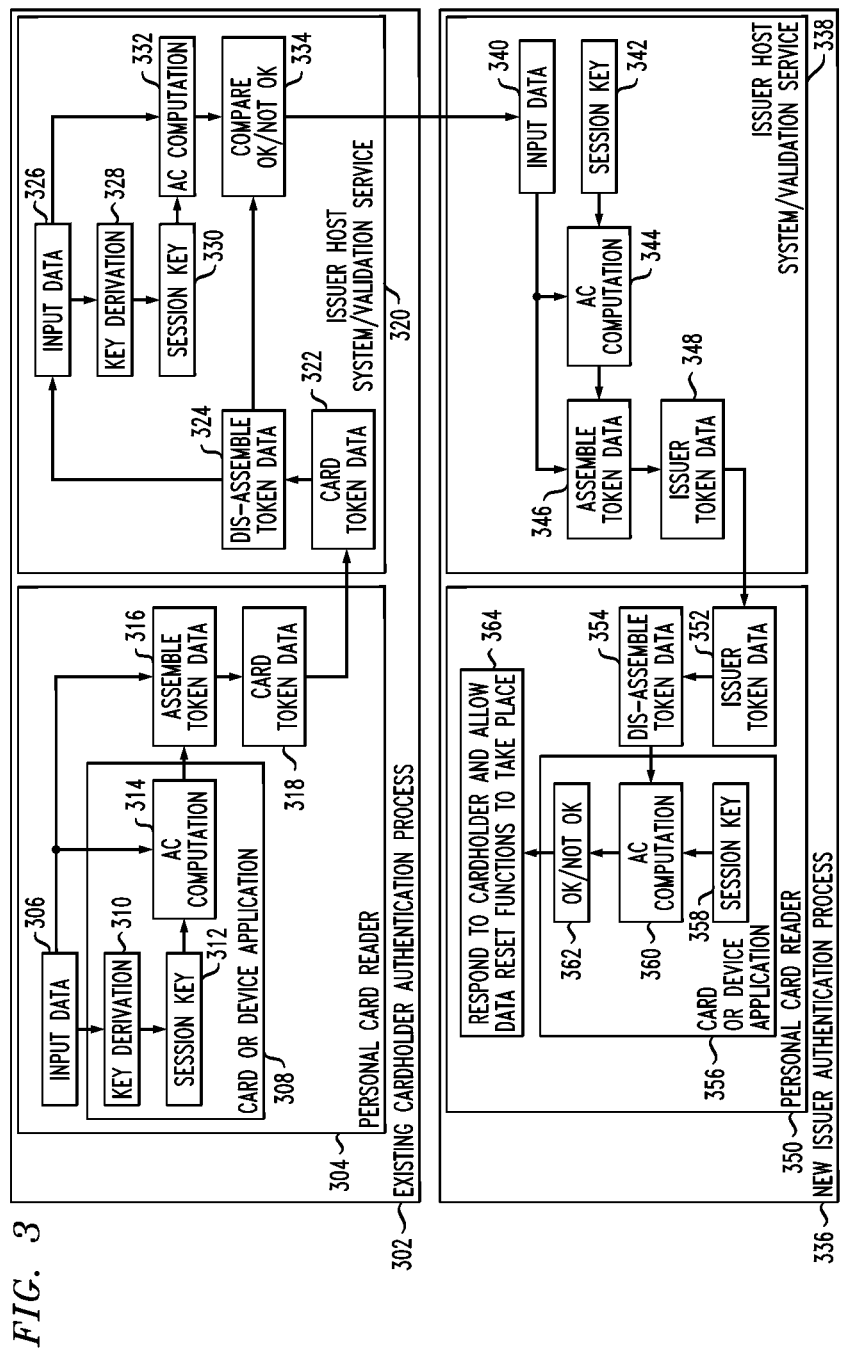
FIG. 3 is a combined block diagram and flow chart illustrating an exemplary embodiment, according to an aspect of the invention.

FIG. 3 is a block diagram illustrating an exemplary embodiment, according to an aspect of the invention. By way of illustration, FIG. 3 depicts an existing cardholder authentication process 302, extended and modified by one or more embodiments of the invention. Note personal card reader 304 and an issuer host system and/or validation service component 320. Although not shown in FIG. 3, it is preferred that as soon as the card or other device on which application 308 resides is brought in contact with or proximity to reader 304, a PIN is entered by the cardholder and verified by the card so as to authenticate the holder to the card. Preferably, unless such PIN verification is successful, further processing is not allowed.

Input data 306 is provided to the personal card reader, and this input can be sent to card or device application 308, which will perform the step of deriving a key (step 310) to obtain session key 312. The session key is created based on the input data and a key stored in the card. The session key is used to encrypt the input data in computation of the application cryptogram (AC) in step 314. Input data 306 may be requested by the card reader at the appropriate time, and may have been supplied to the card holder previously by the issuer or an intermediary. EMV 4.2 Book 2 Annex A Section A1.3 describes non-limiting exemplary session key derivation.

The personal card reader 304 uses the AC and the input data to assemble token data in step 316, thereby creating card token data 318, which is supplied to the host system 320 as shown at 322. In some instances, the card token data is displayed on the card reader and the card holder provides it to entity 320 over the phone or keys it onto an internet screen. The issuer host system 320 disassembles the token data in step 324 and regenerates the input data in step 326. The input data is then used in key derivation step 328 to derive the session key 330, wherein the issuer re-creates the session key generated by the card. The session key and the input data are then used to perform an AC computation in step 332, and the issuer-computed AC is then compared, in step 334, to determine if it matches that computed by the card and sent to the issuer in the card token data. If a match is obtained, the cardholder has been authenticated.

In a non-limiting example, the process just described with respect to the top half of FIG. 3 can be carried out as described in US Patent Publication 2005/0119978 of Ates, entitled "Authentication Arrangement and Method for use with Financial Transactions" and/or US Patent Publication 2008/0154770 of Rutherford et al., entitled "Consumer Authentication in E-Commerce Transactions." The complete disclosures of US Patent Publication 2005/0119978 and US Patent Publication 2008/0154770 are expressly incorporated herein by reference in their entireties for all purposes; these publications describe, inter alia, how a personal computer or other device can be used as a main cardholder access device.

If the match in step 334 is successful, the issuer host system (now referred to as 338 due to its different role in the issuer authentication process at the bottom of the figure) can now continue with the issuer authentication process 336 by taking input data 340 and using it (along with session key 342—same as session key 312 and session key 330) to perform an AC computation in step 344. The AC and the input data are then used to assemble token data in step 346, thereby generating issuer token data 348, which is then provided to the personal card reader (now referred to as 350 due to its different role in the issuer authentication process at the bottom of the figure) in step 352 (for example, by providing the same to a card holder by telephone or an Internet screen and having the card holder key the same into the reader 350). The input data 340 may be the same or different than that from process 302, but if different is nevertheless related to the session key. The session key is the same session key as in process 302, re-created by the issuer.

The personal card reader 350 disassembles the token data in step 354 and provides the output to the card or device application 356 to perform an AC computation, in step 360, based on the disassembled token data, and the same session key 358 as before (e.g., same as 312, 330, 342). This AC, computed with the session key from the card, is then compared, in step 362, to determine if it matches that received from the issuer, and if yes, in step 364, respond to the cardholder and allow data reset functions to take place (e.g., load value, reset risk management parameters, and so on). In at least some instances, the original input data at 306 relates to the (requested) action to be performed upon successful comparison in 362 and the card therefore already knows what should be done (e.g., load value) upon such successful comparison.

As described herein, FIG. 3 depicts a block corresponding to a personal card reader as well as a block corresponding to an issuer host system or validation service, within both the existing cardholder authentication process and within an issuer authentication process implemented via one or more embodiments of the invention. Accordingly, in terms of hardware, in one or more embodiments, there is a host or server that is run by an issuer, a validation service, or an issuer processor; and there is also a personal card reader, which is in communication with the card itself. As such, one or more embodiments of the invention can include the use of a card, a reader, an issuer server, and an alternative link between the user and the issuer server, which can include an internet connection or a telephone to transmit information. Note that unless expressly indicated to the contrary, a "card" is indicative of a traditional "smart" card as well as a "smart" card of non-traditional form factor or other "smart" payment device (e.g., appropriately configured cellular telephone handset, personal digital assistant (PDA), or the like).

As additionally detailed herein, one or more embodiments of the invention serve as an extension to the existing cardholder authentication process. Accordingly, beginning at the top left-hand corner of FIG. 3, input data 306 can be keyed in to the personal card reader 304 by a cardholder, with the data, in some instances, having been acquired from either an internet connection on a screen or quoted over a voice telephone connection. The personal card reader 304 includes a specific card or device application 308 on it that knows what data to ask for and when it is expecting it to be keyed-in.

In one or more embodiments of the invention, the steps being performed by the card or device application (that is, the key derivation to obtain the session key and the computation of the AC) are occurring on the card or other payment device (and not on the reader); those steps can occur in a secure environment inasmuch as the on-card application is effectively owned by the card issuer. Consequently, the AC computation is something that the card issuer can then de-code, and the issuer can prove that it came from a card that it (that is, the issuer) has issued (that is, a genuine card).

Accordingly, in one or more embodiments of the invention, a card is put into proximity of the reader, and the user keys into the reader information that he or she has obtained from the issuer via an internet connection (on a screen) or over a telephone. This information is then used by the card to derive the session key and compute the AC. The reader then assembles the token data and displays it on the card reader. Then, based on that display, the user provides it back to the issuer via a computer connected to the internet or by verbal communication over a telephone.

As depicted in FIG. 3, the issuer now possesses the card token data. By reversing the process, disassembling the card token data and taking the original input data (that is, the data sent to the cardholder in the first place), the issuer can re-create the session key, create the same AC, and compare it with the information that has been sent to the issuer. If the information (i.e., the AC) is the same, the issuer knows that it is a genuine card (issued by the issuer) that was used. Also, as noted, in one or more preferred embodiments of the invention, processing is not permitted unless the user has entered the correct PIN, thereby authenticating himself or herself to the card. Having established that the issuer is dealing with a genuine cardholder with a genuine card, the issuer can potentially allow actions such as, for example, a bank funds transfer to take place.

Additionally, having established that the issuer is dealing with a genuine cardholder, one or more embodiments of the invention can establish that the card that is dealing with a genuine issuer. As also depicted in FIG. 3, the issuer creates input data (this can be either different or the same as the original user input data, but in any event is related to the session key), carries outs an AC computation, creates token data, and sends that information back to the cardholder (either over the internet or telephone). The cardholder can key that information into the reader, and inform the reader that token data is being received. The reader will disassemble the token data, and send the information back to the card, which can effectively decrypt it and validate that it was sent by a genuine issuer.

As illustrated by FIG. 3, the card computes an application cryptogram, at 360, based on that data and the session key. In one or more embodiments of the invention, the session key is created by the card itself (that is, it is the same session key that was created in the cardholder authentication process) using the same input data, or input data that was strongly related to that session key. Because the session key is created from the input data, the issuer can recreate the same session key because the issuer knows how that session key was created. Because the issuer is using that session key (during the issuer authentication process), it is using that session key at 344 to compute the AC and that is what allows the card to use the same session key to decrypt to determine whether the same result is reached (that is, the same result (AC computed by card) as was reached by the issuer (AC computed by issuer and supplied to card)).

Accordingly, the card can perform the "OK/Not OK" check (decision block 362) to determine if the AC computed with the session key from the card matches the data received from the issuer. If there is a match (OK), then the card reader generates a message to the user saying that there is a match and that it is appropriate to allow the requested action to take place on the card. By way of example, if there is a match, the card can send a message such as, for example, "Issuer authenticated," "Value successfully reloaded," etc. If the information did not match, however, the card can provide a message such as, for example, "Security Error," "Transaction Fail," etc.

As such, one or more embodiments of the invention make use, for security purposes, of the fact that the only parties who know that particular session key are the card and the issuer. As described herein, having established the level of trust in this direction (that is, that this card and cardholder are dealing with a genuine issuer), the card can allow (without the need for a physical connection between the card and the issuer) risk management parameters that are stored within the card to be reset, as well as other actions such as, for example, allowing value to be reloaded onto the card, allowing transactions to be performed without going online to interact with the issuer, resetting counters, etc. Additionally, as noted above, one skilled in the art would appreciate that risk management can include, by way of example, determining a number of transactions that a cardholder can conduct before a going online is required, determining an amount that can be spent by a cardholder before going online is required, and so on.

In one or more embodiments of the invention, the request for allowance of a desired action (for example, loading value onto the card, resetting parameters, etc.) will be part of the input data 306 created at the onset of the authentication process. Therefore, as a result of the trust established via the processes detailed above, based on the input data received in connection therewith, the card possesses the information necessary to carry out a desired action. Given the discussion thus far, it will be appreciated that, in general terms, one exemplary method, according to an aspect of the invention, includes obtaining, by a payment device—payment device reader combination, issuer token data, as shown at 352. The issuer token data was generated by an issuer entity 338 from input data 340 and an issuer application cryptogram 344 based on the input data 340 and a session key 342. Additional steps include disassembling the issuer token data, with the payment device—payment device reader combination, as at 354, to obtain the input data and the issuer application cryptogram; as at 360, computing, with the payment device—payment device reader combination, a payment device application cryptogram based on the input data and the session key 358; comparing, with the payment device—payment device reader combination, the payment device application cryptogram to the issuer application cryptogram, as at 362; and allowing at least one action to take place on the payment device if the payment device application cryptogram matches the issuer application cryptogram, as at 364.

It is possible to carry out the steps just described with only a virtual connection between the card or other device and the issuer entity (e.g., by entering a code displayed on a screen or provided over a telephone link, or by having the reader connect to a PC, such as by a USB cable, without having to present the card or other device at a merchant's terminal such as 122, 124, 126).

It will be appreciated that the payment device—payment device reader combination includes reader 350 and the card or other device running application 356. In a preferred but non-limiting approach, the steps performed by the combination are performed by the reader or card or device application as described above with respect to FIG. 3.

As noted, in some instances, the payment device is a chip-based payment card. Further, in some cases, the payment device is a dual interface product (e.g., 1302) that supports both a contacted and a contactless interface.

In one or more instances, the payment device—payment device reader combination obtains the issuer token data without a direct physical connection between the payment device—payment device reader combination and the issuer entity. For example, the issuer token data could be obtained by a holder of the payment device from the issuer entity via display over an internet connection, and entered into the payment device reader by the holder; or obtained by a holder of the payment device from the issuer entity over a verbal telephone connection (e.g., with a human operator or voice synthesis or other interactive voice response (IVR) system), and entered into the payment device reader by the holder.

Examples of an issuer entity are an issuer host system and/or a validation service.

As noted elsewhere, it is preferred that the session key is known only to the issuer entity and the payment device.

In one or more instances, the session key is created by the payment device during an initial cardholder authentication process, as at 310, 312.

Non-limiting examples of the at least one action in step 364 include one or more of adjusting at least one risk management parameter stored within the payment device, allowing value to be loaded onto the payment device, allowing at least one transaction to be performed without going online to interact with the issuer entity, and adjusting at least one counter on the payment device.

In some instances, a payment device includes a payment device memory 108, 118, 1308, storing a device-side payment application in a non-transitory manner; and at least one payment device processor 106, 116, 1306, coupled to the payment device memory. The at least one payment device processor is operative, by executing the device-side payment application, to obtain disassembled issuer token data as described above, as at 354 (for example, from the reader 350); compute a payment device application cryptogram, as at 360, based on the input data and the session key 358; compare the payment device application cryptogram to the issuer application cryptogram, as at 362; and allow at least one action to take place on the payment device if the payment device application cryptogram matches the issuer application cryptogram, as at 364.

Furthermore, given the discussion thus far, it will be appreciated that, in general terms, another exemplary method, according to another aspect of the invention, includes the step 344 of computing, by an issuer entity, an issuer application cryptogram based on input data 340 and a session key 342. The session key was created by a payment device—payment device reader combination during an initial cardholder authentication process, as at 310, 312. Additional steps include using the input data and the issuer application cryptogram to assemble issuer token data, as at 346; and facilitating provision of the issuer token data to the payment device—payment device reader combination, as at 348.

In some cases, the input data is identical to input data provided to the payment device—payment device reader combination during the initial cardholder authentication process, at 306.

The facilitating could include, for example, providing the issuer token data to a holder via display over an internet connection for entry into the payment device reader by the holder, and/or providing the issuer token data to a holder over a verbal telephone connection for entry into the payment device reader by the holder, as described above.

In some instances, a system includes a memory, storing an issuer platform application in a non-transitory manner; and at least one processor coupled to the memory, the at least one processor being operative, by executing the issuer platform application, to carry out or otherwise facilitate any one, some, or all of the method steps just described (e.g., one or more servers, hosts, or other computers as described in connection with FIG. 4 implementing block 320, 338).

Even further, given the discussion thus far, it will be appreciated that, in general terms, still another exemplary method, according to still another aspect of the invention, includes the step 306 of obtaining, at a payment device—payment device reader combination, during an initial cardholder authentication process, first input data; the step 310 of deriving, from the first input data, by the payment device—payment device reader combination, a session key 312, during the initial cardholder authentication process; the step 314 of computing, by the payment device—payment device reader combination, a first payment device application cryptogram based on the input data and the session key, during the initial cardholder authentication process; and facilitating provision of first payment device token data 318 (for example, assembled as at 316), based on the first input data and the first payment device application cryptogram, to an issuer entity 320, during the initial cardholder authentication process.

Additional steps include the step 324 of disassembling, by the issuer entity, of the first payment device token data obtained at 322, to obtain the first input data 326 and the first payment device application cryptogram, during the initial cardholder authentication process; the step 332 of computing, by the issuer entity, a first issuer entity application cryptogram based on the input data 326 and the session key (key 330 same as key 312; derived at 328), during the initial cardholder authentication process; and the step 334 of authenticating a holder of the payment device if the first issuer entity application cryptogram matches the first payment device application cryptogram, during the initial cardholder authentication process.

Still further additional steps include, responsive to the authentication, the step 344 of computing, by the issuer entity, a second issuer application cryptogram based on second input data 340 and the session key 342; the step 346 of using the second input data and the second issuer application cryptogram to assemble issuer token data; and the step 348 of facilitating provision of the issuer token data to the payment device—payment device reader combination.

Even further additional steps include the step 352 of obtaining, by the payment device—payment device reader combination, the issuer token data; the step 354 of recreating or disassembling the issuer token data, with the payment device—payment device reader combination, to obtain the second input data and the second issuer application cryptogram; the step 360 of computing, with the payment device—payment device reader combination, a second payment device application cryptogram based on the second input data and the session key 358; the step 362 of comparing, with the payment device—payment device reader combination, the second payment device application cryptogram to the second issuer application cryptogram; and the step 364 of allowing at least one action to take place on the payment device if the second payment device application cryptogram matches the second issuer application cryptogram.

As noted elsewhere, in some instances, the first input data 306 and the second input data 340 are identical, while in other instances, the first input data and the second input data are not identical, but the second input data is nevertheless related to the session key.

In one or more instances, the payment device—payment device reader combination obtains the issuer token data without a direct physical connection between the payment device—payment device reader combination and the issuer entity. For example, the issuer token data can be obtained by the holder of the payment device from the issuer entity via display over an internet connection, and entered into the payment device reader by the holder; and/or the issuer token data can be obtained by the holder of the payment device from the issuer entity over a verbal telephone connection, and entered into the payment device reader by the holder.

Non-limiting examples of an issuer entity include an issuer host system and/or a validation service.

As noted elsewhere, in some cases, the first input data includes information relating to a payment device action request for which permission is being sought, and the at least one action corresponds to the payment device action request.

In still another aspect of the invention, an exemplary system includes a payment device—payment device reader combination including a payment device—payment device reader combination memory, storing at least one payment application in a non-transitory manner, and at least one payment device—payment device reader combination processor coupled to the payment device—payment device reader combination memory.

Figure 4:
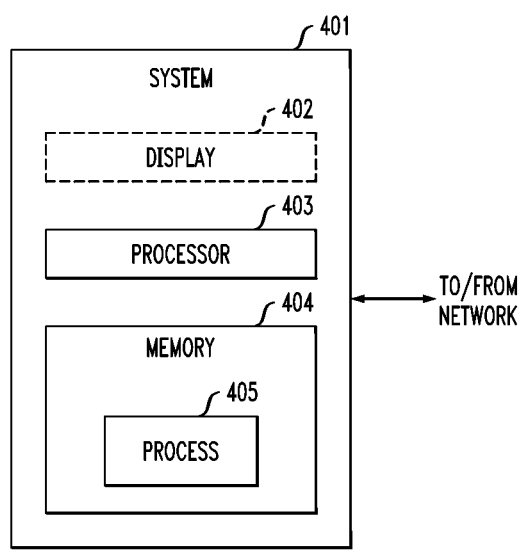
FIG. 4 is a block diagram of an exemplary computer system useful in one or more embodiments of the invention.

In at least some instances, there will be a memory associated with the payment device (e.g., 108, 118, 1308) and another memory associated with the reader (see generally memory 404 of FIG. 4, it being understood that the reader will typically not have all the features of a general purpose computer). Furthermore, in at least some instances, there will be a card or device application 308, 356 running on a card or device processor, and appropriate software and/or firmware running on a processing element of the reader (see generally processor 403 of FIG. 4, it again being understood that the reader will typically not have all the features of a general purpose computer).

The system also includes an issuer entity comprising an issuer entity memory, storing an issuer platform application in a non-transitory manner, and at least one issuer entity processor coupled to the issuer entity memory (for example, a server, host, or other general purpose computer as described generally with respect to FIG. 4).

In the system, the payment device—payment device reader combination is configured to carry out or otherwise facilitate the steps indicated above and the issuer entity is configured to carry out or otherwise facilitate the steps indicated above.

An even further exemplary method, according to a still further aspect of the invention, includes the step of obtaining, by a payment device (e.g. on which application 356 resides), disassembled issuer token data (see arrow from block 354 to block 360). The disassembled issuer token data was generated by disassembling issuer token data (e.g., in step 354). The issuer token data was generated by an issuer entity from: input data, and an issuer application cryptogram based on the input data and a session key (see blocks 340-348). Additional steps include computing a payment device application cryptogram based on the input data and the session key, as at 360; comparing the payment device application cryptogram to the issuer application cryptogram, as at 362; and allowing at least one action to take place on the payment device if the payment device application cryptogram matches the issuer application cryptogram, as at 364.

It should be noted that any of the apparatuses, systems, devices, methods, techniques and/or computer program products described herein are particularly suitable in situations wherein the card or other payment device is not captured by or otherwise in proximity to a merchant's terminal coupled to an issuer through a payment processing network such as 2008 for an on-line transaction, but rather where a cardholder is engaging in an Internet or telephonic order, using a personal card reader in either a connected or an unconnected mode. In this context, an "on-line" transaction wherein the card or other payment device is captured by or otherwise in proximity to a merchant's terminal and coupled to an issuer through a payment processing network should not be confused with "on-line" as used to describe browsing the world wide web.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, 304, 350, a host, server, and/or processing center 140, 142, 144 (optionally with data warehouse 154) of a merchant, issuer, acquirer, processor, or operator of a network 2008 operating according to a payment system standard (and/or specification)(all generally depicted as system 401 in FIG. 4), and the like. Firmware might be employed, for example, in connection with payment devices such as cards 102, 112, 1302, or phone 1420, as well as readers 132, 304, 350.

FIG. 4 is a block diagram of a system 401 that can implement part or all of one or more aspects or processes of the invention. As shown in FIG. 4, memory 404 configures the processor 403 (which could correspond, e.g., to processor portions 106, 116, 130, 1306, 1460; a processor of a reader 132; processors of remote hosts in centers 140, 142, 144; processors of hosts and/or servers implementing various functionality such as 320, 338, and the like) to implement one or more aspects of the methods, steps, and functions disclosed herein (collectively, shown as process 405 in FIG. 4). Different method steps can be performed by different processors. The memory 404 could be distributed or local and the processor 403 could be distributed or singular. The memory 404 could be implemented as an electrical, magnetic or optical memory, or any combination of these or other types of storage devices (including memory portions as described above with respect to cards 102, 112, 1302). It should be noted that if distributed processors are employed, each distributed processor that makes up processor 403 generally contains its own addressable memory space. It should also be noted that some or all of computer system 401 can be incorporated into an application-specific or general-use integrated circuit. For example, one or more method steps could be implemented in hardware in an ASIC rather than using firmware. Display 402 is representative of a variety of possible input/output devices, such as, for example, mice, keyboards, keypads, printers, scanners, and so on.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a card and/or card reader and another device could be a physical memory media associated with an issuer entity. As used herein, a tangible computer-readable recordable storage medium is intended to encompass a recordable medium, examples of which are set forth above, but is not intended to encompass a transmission medium or disembodied signal. Such a tangible computer-readable recordable storage medium stores data and/or program instructions in a non-transitory manner.

The computer systems and servers described herein each contain a memory that will configure associated processors to implement the methods, steps, and functions disclosed herein. Such methods, steps, and functions can be carried out, by way of example and not limitation, by processing capability on payment devices such as 102, 112, 1302, 1420; elements 122, 124, 126, 140, 142, 144, 130, 132, 2004, 2006, 2008, 2010, 304, 350, 320, 338, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 102, 112, 1302, 1420, 122, 124, 126, 140, 142, 144, 130, 132, 2004, 2006, 2008, 2010, 304, 350, 320, 338, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 401 as shown in FIG. 4) running a server program. It will be understood that such a physical server may or may not include a display, keyboard, or other input/output components. A "host" includes a physical data processing system (for example, system 401 as shown in FIG. 4) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include a payment device application module and an issuer host module. The payment device application module can run, for example, on one or more hardware processors of a card or other payment device. The issuer host module can run, for example, on a host or server of an issuer entity. In some instances, there is also a card reader module; furthermore, a combined module can be thought of as combining the card reader and card functionality. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed, for example, to implement the logic depicted in FIG. 3.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining, by a payment device—payment device reader combination, issuer token data generated by an issuer entity from input data, and an issuer application cryptogram based on said input data and a session key;
   disassembling said issuer token data, by said payment device—payment device reader combination, to obtain said input data and said issuer application cryptogram;
   computing, by said payment device—payment device reader combination, a payment device application cryptogram based on said input data and said session key;
   comparing, by said payment device—payment device reader combination, said payment device application cryptogram to said issuer application cryptogram and determining that a requested action is allowed upon determining that said payment device application cryptogram matches said issuer application cryptogram; and
   receiving updated data on said payment device according to said requested action,
   wherein said updated data comprises at least one of:
      a value reloaded onto said payment device;
      a first reset risk management parameter comprising an allowable number of offline transactions before said payment device must go online; and
      a second reset risk management parameter comprising an allowable amount of offline spending by said payment device.

2. The method of claim 1, wherein, in said computing step, said payment device application cryptogram is computed by an integrated circuit chip of said payment device.

3. The method of claim 2, further comprising communicating with a terminal in said computing step via a dual interface product of said payment device that supports both a contacted and a contactless interface.

4. The method of claim 1, wherein said payment device—payment device reader combination obtains said issuer token data without an electronic connection between said payment device—payment device reader combination and said issuer entity.

5. The method of claim 4, wherein said issuer entity comprises at least one of an issuer host system and a validation service, and wherein said issuer token data is obtained by a holder of said payment device from said issuer entity via display over an internet connection, and entered into said payment device reader by said holder.

6. The method of claim 4, wherein said issuer entity comprises at least one of an issuer host system and a validation service, and wherein said issuer token data is obtained by a holder of said payment device from said issuer entity over a verbal telephone connection, and entered into said payment device reader by said holder.

7. The method of claim 1, wherein, in said obtaining and computing steps, said session key is known only to said issuer entity and said payment device.

8. The method of claim 1, further comprising creating said session key by said payment device during an initial cardholder authentication process.

9. A payment device comprising:
a payment device memory, storing a device-side payment application in a non-transitory manner; and
at least one payment device processor coupled to said payment device memory, said at least one payment device processor being operative, by executing said device-side payment application, to:
 obtain disassembled issuer token data, said disassembled issuer token data having been generated by disassembling issuer token data, said issuer token data having been generated by an issuer entity from:
  input data, and
  an issuer application cryptogram based on said input data and a session key;
 compute a payment device application cryptogram based on said input data and said session key;
 compare said payment device application cryptogram to said issuer application cryptogram and determine that a requested action is allowed upon determining that said payment device application cryptogram matches said issuer application cryptogram; and
 receive updated data on said payment device according to said requested action;
wherein said updated data comprises at least one of:
 a value reloaded onto said payment device;
 a first reset risk management parameter comprising an allowable number of offline transactions before said payment device must go online; and
 a second reset risk management parameter comprising an allowable amount of offline spending by said payment device.

10. The payment device of claim 9, wherein said session key is known only to said issuer entity and said payment device.

11. The payment device of claim 9, wherein said session key is created by said device-side payment application during an initial cardholder authentication process.

12. An apparatus, comprising:
 means, other than a transmission medium or disembodied signal, for obtaining, by a payment device—payment device reader combination, issuer token data generated by an issuer entity from input data, and an issuer application cryptogram based on said input data and a session key;
 means, other than a transmission medium or disembodied signal, for disassembling said issuer token data, by said payment device—payment device reader combination, to obtain said input data and said issuer application cryptogram;
 means, other than a transmission medium or disembodied signal, for computing, by said payment device—payment device reader combination, a payment device application cryptogram based on said input data and said session key;
 means, other than a transmission medium or disembodied signal, for comparing, by said payment device—payment device reader combination, said payment device application cryptogram to said issuer application cryptogram and determining that a requested action is allowed upon determining that said payment device application cryptogram matches said issuer application cryptogram; and
 means, other than a transmission medium or disembodied signal, for receiving updated data on said payment device according to said requested action;
wherein said updated data comprises at least one of:
 a value reloaded onto said payment device;
 a first reset risk management parameter comprising an allowable number of offline transactions before said payment device must go online; and
 a second reset risk management parameter comprising an allowable amount of offline spending by said payment device.

13. A method comprising the steps of:
computing, by an issuer entity, an issuer application cryptogram based on input data and a session key, wherein said session key was created by a payment device—payment device reader combination during an initial cardholder authentication process;
using said input data and said issuer application cryptogram to assemble issuer token data; and
facilitating provision of said issuer token data to said payment device—payment device reader combination;
wherein said facilitating comprises providing said issuer token data to a holder over a verbal telephone connection for entry into said payment device reader by said holder.

14. A system comprising:
a memory, storing an issuer platform application in a non-transitory manner; and
at least one processor coupled to said memory, said at least one processor being operative, by executing said issuer platform application, to:
 compute an issuer application cryptogram based on input data and a session key, wherein said session key was created by a payment device—payment device reader combination during an initial cardholder authentication process;
 use said input data and said issuer application cryptogram to assemble issuer token data; and
 facilitate provision of said issuer token data to said payment device—payment device reader combination;
wherein said at least one processor is operative to facilitate by facilitating provision of said issuer token data to a holder over a verbal telephone connection for entry into said payment device reader by said holder.

15. A method comprising the steps of:
obtaining, at a payment device—payment device reader combination, during an initial cardholder authentication process, first input data;
deriving, from said first input data, by said payment device—payment device reader combination, a session key, during said initial cardholder authentication process;
computing, by said payment device—payment device reader combination, a first payment device application cryptogram based on said input data and said session key, during said initial cardholder authentication process;
facilitating provision of first payment device token data, based on said first input data and said first payment device application cryptogram, to an issuer entity, during said initial cardholder authentication process;
disassembling, by said issuer entity, of said first payment device token data, to obtain said first input data and said first payment device application cryptogram, during said initial cardholder authentication process;
computing, by said issuer entity, a first issuer entity application cryptogram based on said input data and said session key, during said initial cardholder authentication process;
authenticating a holder of said payment device if said first issuer entity application cryptogram matches said first payment device application cryptogram, during said initial cardholder authentication process;

responsive to said authentication, computing, by said issuer entity, a second issuer application cryptogram based on second input data and said session key;

using said second input data and said second issuer application cryptogram to assemble issuer token data;

facilitating provision of said issuer token data to said payment device—payment device reader combination;

obtaining, by said payment device—payment device reader combination, said issuer token data;

disassembling said issuer token data, by said payment device—payment device reader combination, to obtain said second input data and said issuer application cryptogram;

computing, by said payment device—payment device reader combination, a second payment device application cryptogram based on said second input data and said session key;

comparing, by said payment device—payment device reader combination, said second payment device application cryptogram to said second issuer application cryptogram; and allowing at least one action to take place on said payment device if said second payment device application cryptogram matches said second issuer application cryptogram;

wherein said at least one action comprises at least one of:
allowing value to be reloaded onto said payment device;
resetting a risk management parameter comprising an allowable number of offline transactions before said payment device must go online; and
resetting a risk management parameter comprising an allowable amount of offline spending by said payment device.

16. The method of claim 15, wherein said first input data and said second input data are identical.

17. The method of claim 15, wherein said first input data and said second input data are not identical, but wherein said second input data is related to said session key.

18. The method of claim 15, wherein said payment device—payment device reader combination obtains said issuer token data without an electronic connection between said payment device—payment device reader combination and said issuer entity.

19. The method of claim 18, wherein said issuer entity comprises at least one of an issuer host system and a validation service, and wherein said issuer token data is obtained by said holder of said payment device from said issuer entity via display over an internet connection, and entered into said payment device reader by said holder.

20. The method of claim 18, wherein said issuer entity comprises at least one of an issuer host system and a validation service, and wherein said issuer token data is obtained by said holder of said payment device from said issuer entity over a verbal telephone connection, and entered into said payment device reader by said holder.

21. The method of claim 15, wherein said first input data comprises information relating to a payment device action request for which permission is being sought, and wherein said at least one action corresponds to said payment device action request.

22. A system comprising:
a payment device—payment device reader combination comprising a payment device—payment device reader combination memory, storing at least one payment application in a non-transitory manner, and at least one payment device—payment device reader combination processor coupled to said payment device—payment device reader combination memory; and an issuer entity comprising an issuer entity memory, storing an issuer platform application in a non-transitory manner, and at least one issuer entity processor coupled to said issuer entity memory;

wherein:
said payment device—payment device reader combination is configured to obtain, during an initial cardholder authentication process, first input data, by executing said at least one payment application on said at least one payment device—payment device reader combination processor;

said payment device—payment device reader combination is configured to derive, from said first input data, a session key, during said initial cardholder authentication process, by executing said at least one payment application on said at least one payment device—payment device reader combination processor;

said payment device—payment device reader combination is configured to compute a first payment device application cryptogram based on said input data and said session key, during said initial cardholder authentication process, by executing said at least one payment application on said at least one payment device—payment device reader combination processor;

said payment device—payment device reader combination is configured to facilitate provision of first payment device token data, based on said first input data and said first payment device application cryptogram, to said issuer entity, during said initial cardholder authentication process;

said issuer entity is configured to disassemble said first payment device token data, to obtain said first input data and said first payment device application cryptogram, during said initial cardholder authentication process, by executing said issuer platform application on said at least one issuer entity processor;

said issuer entity is configured to compute a first issuer entity application cryptogram based on said input data and said session key, during said initial cardholder authentication process, by executing said issuer platform application on said at least one issuer entity processor;

said issuer entity is configured to authenticate a holder of said payment device if said first issuer entity application cryptogram matches said first payment device application cryptogram, during said initial cardholder authentication process, by executing said issuer platform application on said at least one issuer entity processor;

said issuer entity is configured to, responsive to said authentication, compute a second issuer application cryptogram based on second input data and said session key, by executing said issuer platform application on said at least one issuer entity processor;

said issuer entity is configured to use said second input data and said second issuer application cryptogram to assemble issuer token data, by executing said issuer platform application on said at least one issuer entity processor;

said issuer entity is configured to facilitate provision of said issuer token data to said payment device—payment device reader combination, by executing said issuer platform application on said at least one issuer entity processor;

said payment device—payment device reader combination is configured to obtain said issuer token data, by executing said at least one payment application on said at least one payment device—payment device reader combination processor;

said payment device—payment device reader combination is configured to disassemble said issuer token data to obtain said second input data and said second issuer application cryptogram, by executing said at least one payment application on said at least one payment device—payment device reader combination processor;

said payment device—payment device reader combination is configured to compute a second payment device application cryptogram based on said second input data and said session key, by executing said at least one payment application on said at least one payment device—payment device reader combination processor;

said payment device—payment device reader combination is configured to compare said second payment device application cryptogram to said second issuer application cryptogram, by executing said at least one payment application on said at least one payment device—payment device reader combination processor and determine that a requested action is allowed upon determining that said payment device application cryptogram matches said issuer application cryptogram; and said payment device—payment device reader combination is configured to receive updated data on said payment device according to said requested action by executing said at least one payment application on said at least one payment device—payment device reader combination processor;

wherein said updated data comprises at least one of:
a value reloaded onto said payment device;
a first reset risk management parameter comprising an allowable number of offline transactions before said payment device must go online; and
a second reset risk management parameter comprising an allowable amount of offline spending by said payment device.

23. The system of claim 22, wherein said payment device—payment device reader combination obtains said issuer token data without an electronic connection between said payment device—payment device reader combination and said issuer entity.

24. The system of claim 23, wherein said issuer entity comprises at least one of an issuer host system and a validation service, and wherein said issuer token data is obtained by said holder of said payment device from said issuer entity via display over an internet connection, and entered into said payment device reader by said holder.

25. The system of claim 23, wherein said issuer entity comprises at least one of an issuer host system and a validation service, and wherein said issuer token data is obtained by said holder of said payment device from said issuer entity over a verbal telephone connection, and entered into said payment device reader by said holder.

26. The system of claim 22, wherein said first input data comprises information relating to a payment device action request for which permission is being sought, and wherein said at least one action corresponds to said payment device action request.

27. An apparatus comprising:
means, other than a transmission medium or disembodied signal, for obtaining, at a payment device—payment device reader combination, during an initial cardholder authentication process, first input data;
means, other than a transmission medium or disembodied signal, for deriving, from said first input data, by said payment device—payment device reader combination, a session key, during said initial cardholder authentication process;
means, other than a transmission medium or disembodied signal, for computing, by said payment device—payment device reader combination, a first payment device application cryptogram based on said input data and said session key, during said initial cardholder authentication process;
means, other than a transmission medium or disembodied signal, for facilitating provision of first payment device token data, based on said first input data and said first payment device application cryptogram, to an issuer entity, during said initial cardholder authentication process;
means, other than a transmission medium or disembodied signal, for disassembling, by said issuer entity, of said first payment device token data, to obtain said first input data and said first payment device application cryptogram, during said initial cardholder authentication process;
means, other than a transmission medium or disembodied signal, for computing, by said issuer entity, a first issuer entity application cryptogram based on said input data and said session key, during said initial cardholder authentication process;
means, other than a transmission medium or disembodied signal, for authenticating a holder of said payment device if said first issuer entity application cryptogram matches said first payment device application cryptogram, during said initial cardholder authentication process;
means, other than a transmission medium or disembodied signal, for responsive to said authentication, computing, by said issuer entity, a second issuer application cryptogram based on second input data and said session key;
means, other than a transmission medium or disembodied signal, for using said second input data and said second issuer application cryptogram to assemble issuer token data;
means, other than a transmission medium or disembodied signal, for facilitating provision of said issuer token data to said payment device—payment device reader combination;
means, other than a transmission medium or disembodied signal, for obtaining, by said payment device—payment device reader combination, said issuer token data;
means, other than a transmission medium or disembodied signal, for disassembling said issuer token data, by said payment device—payment device reader combination, to obtain said second input data and said second issuer application cryptogram;
means, other than a transmission medium or disembodied signal, for computing, by said payment device—payment device reader combination, a second payment device application cryptogram based on said second input data and said session key;
means, other than a transmission medium or disembodied signal, for comparing, by said payment device—payment device reader combination, said second payment device application cryptogram to said second issuer application cryptogram and determining that a requested action is allowed upon determining that said payment device application cryptogram matches said issuer application cryptogram; and means, other than a transmission medium or disembodied signal, for receiving updated data on said payment device according to said requested action;

wherein said updated data comprises at least one of:
  a value reloaded onto said payment device;
  a first reset risk management parameter comprising an allowable number of offline transactions before said payment device must go online; and
  a second reset risk management parameter comprising an allowable amount of offline spending by said payment device.

28. A method comprising the steps of:

obtaining, by a payment device, disassembled issuer token data, said disassembled issuer token data having been generated by disassembling issuer token data, said issuer token data having been generated by an issuer entity from:
  input data, and
  an issuer application cryptogram based on said input data and a session key;

computing a payment device application cryptogram based on said input data and said session key;

comparing said payment device application cryptogram to said issuer application cryptogram and determining that a requested action is allowed upon determining that said payment device application cryptogram matches said issuer application cryptogram; and receiving updated data on said payment device according to said requested action, wherein said updated data comprises at least one of:
  a value reloaded onto said payment device;
  a first reset risk management parameter comprising an allowable number of offline transactions before said payment device must go online; and
  a second reset risk management parameter comprising an allowable amount of offline spending by said payment device.

* * * * *